United States Patent
Lee et al.

(10) Patent No.: US 6,828,851 B1
(45) Date of Patent: Dec. 7, 2004

(54) CONSTANT VOLTAGE CHARGE-PUMP CIRCUIT WITH FEEDBACK

(75) Inventors: Bumha Lee, Mountain View, CA (US); Shivani Gupta, Milpitas, CA (US); Christina Phan, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/286,096

(22) Filed: Oct. 31, 2002

(51) Int. Cl.[7] .............................................. G05F 1/575
(52) U.S. Cl. ..................... 327/537; 327/536; 327/554; 363/60
(58) Field of Search ................................ 327/535–538, 327/540, 541, 543, 554; 363/59, 60

(56) References Cited

U.S. PATENT DOCUMENTS

| | | | | |
|---|---|---|---|---|
| 5,541,531 A | * | 7/1996 | Kultgen | ...................... 327/534 |
| 5,898,335 A | * | 4/1999 | Miyamoto et al. | .......... 327/535 |
| 6,486,729 B2 | * | 11/2002 | Imamiya | ..................... 327/537 |
| 6,510,394 B2 | * | 1/2003 | Huang et al. | ................. 702/65 |

* cited by examiner

Primary Examiner—Timothy P. Callahan
Assistant Examiner—Terry L. Englund
(74) Attorney, Agent, or Firm—Merchant & Gould; Timothy P. Sullivan

(57) ABSTRACT

A charge-pump circuit generates a constant voltage higher than the available power supply. A feedback path maintains the voltage at a constant level in spite of power supply, temperature and process variations. This charge pump circuit includes a switched capacitor interface arranged to generate a target voltage that is used to activate and deactivate a bypass capacitor interface to maintain the constant voltage. The bypass capacitor interface is configured to complete the feedback path. The feedback helps to ensure that node n1, that is coupled to the output of the charge pump, stays at a constant potential, irrespective of the power supply voltage.

13 Claims, 4 Drawing Sheets

US 6,828,851 B1

CONSTANT VOLTAGE CHARGE-PUMP CIRCUIT WITH FEEDBACK

FIELD OF THE INVENTION

The present invention is related to integrated circuits (IC), and more particularly to charge-pump circuits.

BACKGROUND OF THE INVENTION

The fabrication processes for complimentary metal-oxide semiconductor (CMOS) ICs have evolved fast in the past few years for attaining higher speeds and lower power consumption. Typically, an N-channel MOSFET is fabricated by diffusing two identical N regions, called the source and the drain, side-by-side into a P-type silicon slice. A layer of insulating silicon-oxide, a.k.a. gate-oxide, is grown over the surface. A third conducting poly-silicon layer, a.k.a. the gate, is placed above the gate-oxide and between the two N-regions.

When a positive voltage is applied to the gate, charge-inversion takes place in the P-type silicon region below the gate-oxide. The charge-inversion layer extends from the source to the drain and is called the channel. Moving charge or current in the channel can be increased by increasing the gate voltage of the transistor.

Changes that have been made to the fabrication process of MOSFETs, have resulted in reduction of layer geometries, including the thickness of the gate-oxide layer. This reduction of the layer geometries, in consequence, has put a limit on maximum voltage that can be applied to the gates of transistors. If the voltage exceeds the specified limit, it causes physical damage to the gate-oxide. This phenomenon, which is referred to as oxide-breakdown, creates fissures in the gate-oxide and damages transistors.

In many analog applications where an N-channel transistor switch needs to pass a large amplitude signal (up to the supply voltage) from the source to drain, a high level voltage at the gate needs to be a threshold above the input signal in order to pass the signal through uncorrupted. This high level voltage at the gate is beyond the supply voltage and requires special circuitry, known as a charge-pump, to generate it. Unfortunately, charge-pumps are susceptible to many variations that affect their output. For example, the output of the charge-pump will vary over many variables, such as temperature, supply, clock speed, process variation, and the like. These undesirable variations may cause the output voltage to go over the absolute maximum voltage allowed by the associated fabrication process resulting in oxide-breakdown.

What is needed is a way to generate a high voltage that is constant over all variations such that the voltage does not go above the oxide-breakdown limit.

SUMMARY OF THE INVENTION

Briefly described, the present invention is directed at providing charge-pump circuit designed to generate a higher voltage than the available power supply. A feedback technique helps to maintain the voltage at a constant level in spite of power supply and temperature and process variations.

According to one aspect of the invention, a charge pump includes a feedback path that is used to help maintain a constant voltage higher than the available supply voltage.

According to another aspect of the invention a switched capacitor interface generates a target voltage that is used to activate and deactivate a bypass capacitor interface to maintain the constant voltage. The switched capacitor interface includes capacitors that are sized to create the target voltage.

According to another aspect of the invention the bypass capacitor interface is configured to complete a feedback path. The feedback helps to ensure that node n1, that is coupled to the output of the charge pump, stays at a constant potential, irrespective of the power supply voltage.

According to yet another aspect of the invention, a method is directed at generating a higher voltage than the available power supply. A comparison is made to determine if the charge pump is at the target voltage. Based on the comparison, feedback helps to ensure that the higher voltage is constant.

DETAILED DESCRIPTION OF THE PREFERRED EMBODIMENT

Figure 1:
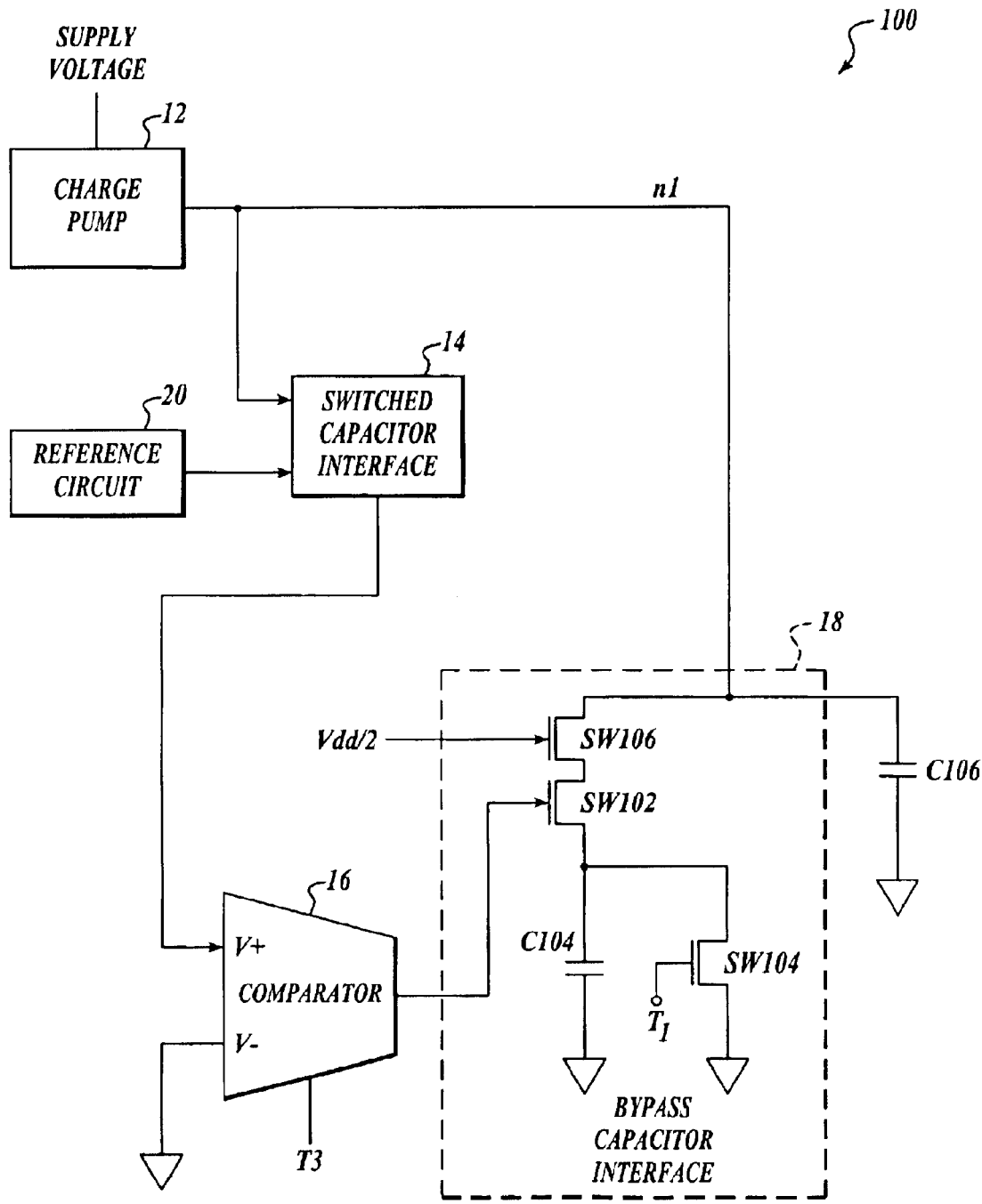
FIG. 1 illustrates a block diagram of a constant voltage charge-pump circuit having feedback.

In the following detailed description of exemplary embodiments of the invention, reference is made to the accompanied drawings, which form a part hereof, and which is shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, or data signal. Referring to the drawings, like numbers indicate like parts throughout the views.

The present invention is directed at a circuit and method for generating a voltage higher than the available supply voltage, maintaining it at a constant level over power-supply variations, and variations in fabrication process parameters and the operating temperature, utilizing a feedback technique.

As discussed, fabrication processes are evolving towards smaller and smaller dimensions. These smaller dimensions are pushing the limits lower on the absolute maximum voltage that can be applied to the gates of transistors. One method for generating the higher voltage utilizes an operational amplifier and resistors in a high-gain, non-inverting feedback configuration. A charge-pump drives the operational amplifier and the resistive network and pumps-up the supply voltage, Vcc, to a higher voltage. This technique, however, requires large current drive capability, or dissipates larger current, and the design consists of resistors which are the noisy circuit elements.

Another technique, which is a low power and low noise solution, employs generation of the constant voltage that is higher than the power supply with a charge-pump and then comparing the output of the charge-pump to an available low constant bandgap reference voltage with a switched-capacitor network to maintain it at a constant level. This method, which is also ideal for driving capacitive load, will now be described.

FIG. 1 illustrates a block diagram of a constant voltage charge-pump circuit having feedback, in accordance with aspects of the invention. As illustrated in the figure, charge-pump circuit 100 includes charge-pump 12, switched capacitor interface 14, comparator 16, bypass capacitor interface 18, and reference 20. Bypass capacitor interface includes transistor SW102, transistor SW104, transistor SW106, capacitor C104, and capacitor C106.

Charge-pump 12 includes an input for receiving a supply voltage and an output configured to generate a voltage at node n1. Charge-pump 12 is configured to generate a voltage at node n1 that is higher than the available power supply.

Switched-capacitor interface 14 includes an input coupled to node n1 and an input coupled to a stable signal reference circuit (20). According to one embodiment of the invention, reference 20 is a bandgap reference on the same silicon as charge-pump circuit 100 that is configured to generate a stable reference voltage. Briefly described, a bandgap reference generator is a commonly used circuit that is capable of generating a stable reference voltage on the chip. According to one embodiment of the invention, reference 20 produces a stable one volt reference. Other voltages or signals may be used. This reference voltage is relatively constant over a range of power supply voltages and is generally insensitive to temperature variations. There are many ways to design a bandgap reference circuit.

Switched-capacitor interface 14 acts like a voltage divider for the voltage at node n1. Switched-capacitor interface 14 is configured to set a target voltage (See FIG. 2 and related discussion). Generally, capacitors within the switched-capacitor interface are sized appropriately to set the target voltage.

Comparator 16 includes an input coupled to the output of switched-capacitor interface 14, an input coupled to ground, an input coupled to the supply voltage, and an input coupled to timing signal T3. According to one embodiment of the invention, the output of switched-capacitor interface 14 is coupled to the non-inverting input (+) of comparator 16 and the inverting input (−) is coupled to ground. Comparator 16 is configured to compare a constant low voltage to the divided down voltage at node n1, and in response to the comparison, output either a high level signal or a low level signal. Comparator 16 triggers in response to signal T3. According to one embodiment of the invention, comparator 16 triggers when signal T3 is high.

During the trigger time ((See FIG. 3 and related discussion) when voltage input V+ is higher than voltage input V−, comparator 16 outputs a logic "1" and when V+ is lower than V−, comparator 16 outputs a logic "0". The circuit may be designed to work with different logic levels and different signals.

The output of comparator 16 is used to control switch SW102 in bypass capacitor interface 18. A logic "1" output from comparator 16 turns switch SW102 "on" and a logic "0" turns switch SW102 "off". SW102 connects the charge-pump output coupled to node n1, which is connected to a large external bypass capacitor C106 to capacitor C104. Switch SW106 is used for protection from breakdown of SW102. Switch SW104 is configured to constantly discharge capacitor C104 to help ensure that excess charge does not build up on the plates of C104. Capacitor C106 is chosen such that it is much bigger than capacitor C303 illustrated in the charge-pump circuit shown in FIG. 4.

Bypass capacitor interface 18 completes a feedback path by connecting comparator 16's output back to node n1. Bypass interface 18 consists of switches SW102 and SW104, a series capacitor C104 and capacitor C106. According to one embodiment of the invention, capacitor C106 (bypass capacitor) is placed outside the silicon because of its large size requirements to stabilize the charge pump output voltage. The feedback helps to ensure that node n1 stays at a constant potential, irrespective of the power supply voltage, fabrication process and temperature variations.

An exemplary illustration will now be described. Initially, when the power supply is coupled to the charge-pump circuit 100, node n1 starts off at a low voltage. Comparator 16 initially outputs a logic "0". Charge-pump 12 "pumps-up" node n1 (or charges up node n1 with the help of capacitor C303 shown in FIG. 4) until it reaches the target voltage. Once the node voltage at n1 goes beyond the target voltage, comparator 16 output switches to a logic "1", which turns on switch SW102. Turning on switch SW102 results in redistribution of the total charge on capacitors C106 and C305 (See FIG. 4) with C104 which drops the voltage on n1 by a small amount. As mentioned earlier, capacitor C104 is much bigger than capacitor C303 so that the subtracted charge from node n1 is higher than the added charge. This makes the whole negative feedback loop converge. The feedback helps to maintain the constant level of node n1 even with power supply and temperature variations.

Figure 2:
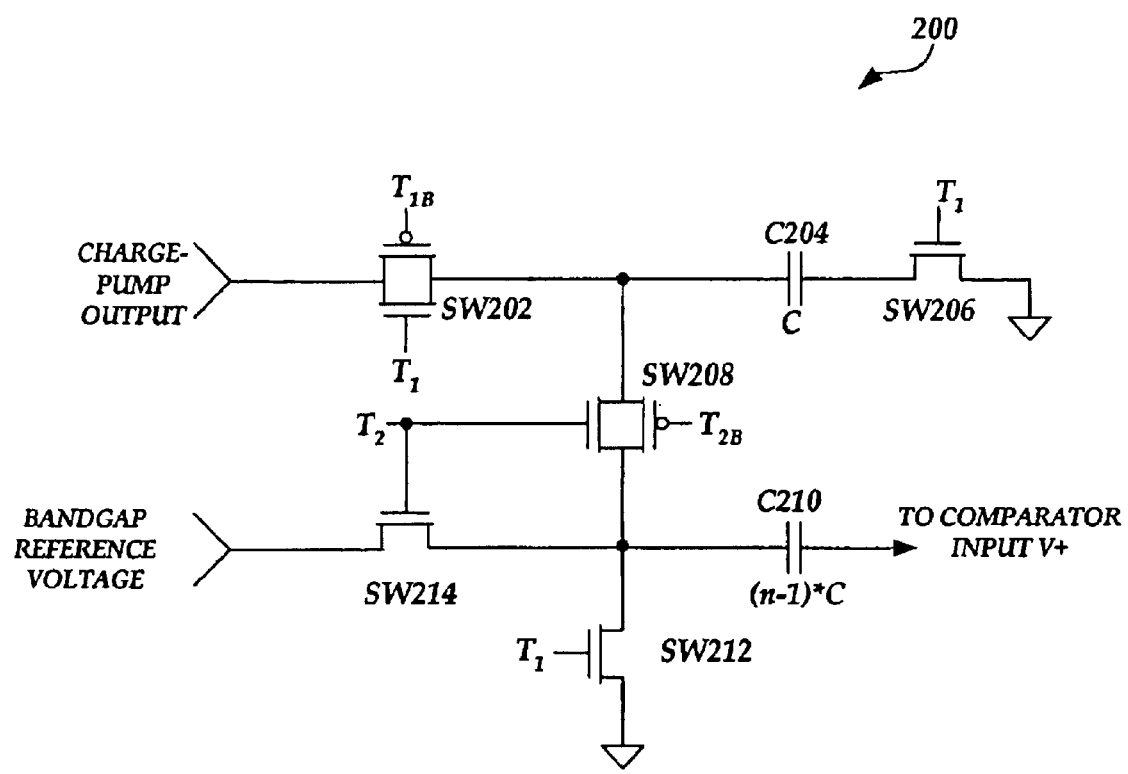
FIG. 2 shows a schematic of a switched-capacitor interface.

FIG. 2 shows a schematic of a switched-capacitor interface, in accordance with aspects of the invention. As shown in FIG. 2, switched-capacitor interface 200 includes capacitors C204 and C210, and N and P channel switches SW202, SW206, SW208, SW212, and SW214.

Capacitors C204 and C210 are sized to produce the target voltage signal hat is coupled to the comparator illustrated in FIG. 1. Capacitors C210 and C204 are ratioed as C and (n−1)*C (n>1) based on the fact that the target output voltage at n1 is "n" times the low-constant bandgap voltage. According to one embodiment of the invention, the capacitors (C204 and C210) are poly-poly capacitors.

As an example, if a constant voltage 4 volts is to be generated at node n1 with the low-constant bandgap reference voltage at 1 volt and the power supply is at 3.3 volts, then n would be 4. Capacitors C204 and C210 according to this example are C and 3C, respectively. Under ideal conditions, during clock signal T1 the total charge sampled on capacitor C204 is 4*C. During clock signal T2, the total charge on capacitors C204 and C210 is IV*4C or 4*C.

The voltage, however, on node n1 can move higher or lower than 4 volts. If the voltage moves higher, the smaller capacitor C (C204) accumulates more positive charge during T1. During T2, when charges are shared between C (C204) and 3C (C210), the excess positive charge on C (C204) moves the V+ input of the comparator to a positive voltage that is higher than ground. As a result of the V+ input of the comparator moving to a positive voltage higher than ground, the comparator outputs a logic "1" which, in turn, turns switch SW102 "on" as shown in FIG. 1. Since switch SW102 connects the charge pump output at node n1 to capacitor C104, the higher charge-pump voltage bleeds into ground as excessive charge through capacitor C104. This results in a drop in the charge-pump output, bringing n1 down to 4 volts.

On the other hand, if the charge-pump output drops low, the total accumulated charge on the combination of capacitors, C (C204) and 3C (C210), is negative. This results in a logic "0" out of the comparator and the switch SW102 is in the "off" position. Consequently, node n1 is "pumped up" or increased by the charge-pump function, thus bringing it back up to 4 volts.

Clock signals T1 and T2 refer to the times when a switch turns on. See FIG. 3 for the timing relationship of T1 and T2.

During clock T1, the charge-pump output at node n1 is stored on capacitor C204 as switches SW202 and SW206 are turned on. Capacitor C210 is is charged as its top and bottom plates connect to ground, or the lowest available supply voltage, via switches SW206 and SW212.

During clock T2, the total charge stored on capacitor. C204 is shared or redistributed with capacitor C210 and a new voltage appears across the parallel combination of capacitors C204 and C2 10. This new voltage is equal to the node voltage on n1 divided by the equivalent capacitor formed by the parallel combination of capacitors C204 and C210. This voltage is compared with the low-constant reference voltage by the comparator during clock T3. Clock T3 is delayed from clock T2 to ensure proper settling of charge on all capacitors before triggering on the comparator.

Figure 3:
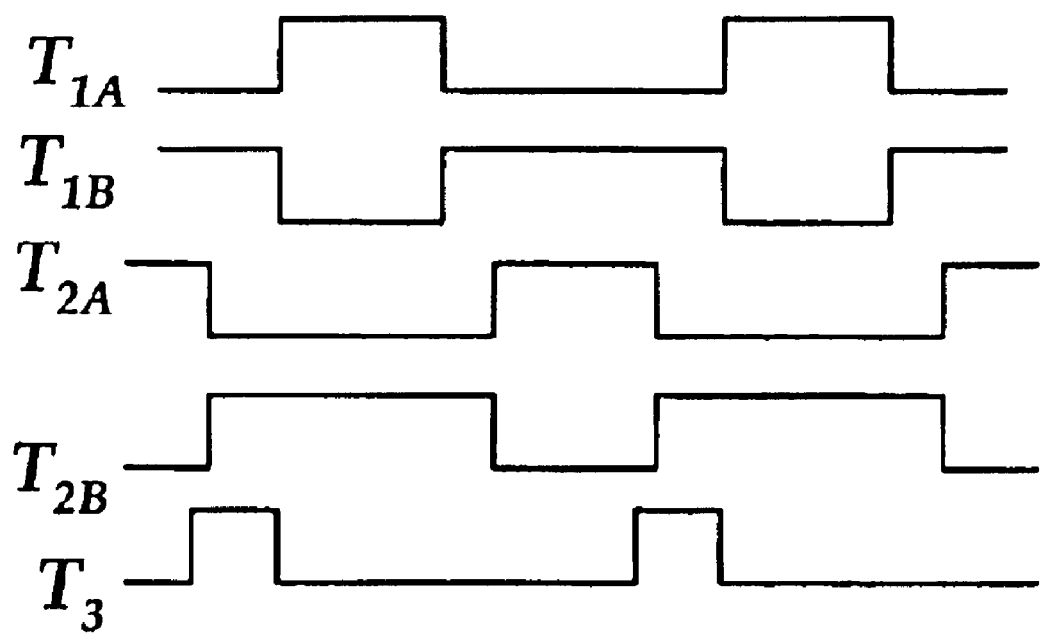
FIG. 3 illustrates exemplary timing diagrams for the clock signals illustrated in FIG. 2.

FIG. 3 illustrates exemplary timing diagrams for the clock signals illustrated in FIG. 2, in accordance with aspects of the invention.

When timing signal T1 is high, switches SW202 and SW206 are on. When timing signal T2 is high, switches SW208 and SW214 are on. The rising edge of clock T3 should be in advance of falling edge of clock T2 to ensure that the V+input of comparator is settled down. T3 is used to trigger comparator 16 as illustrated in FIG. 1. At the rising edge of clock T3, comparator 16 triggers (See FIGS. 1 and 15 related discussion).

Figure 4:
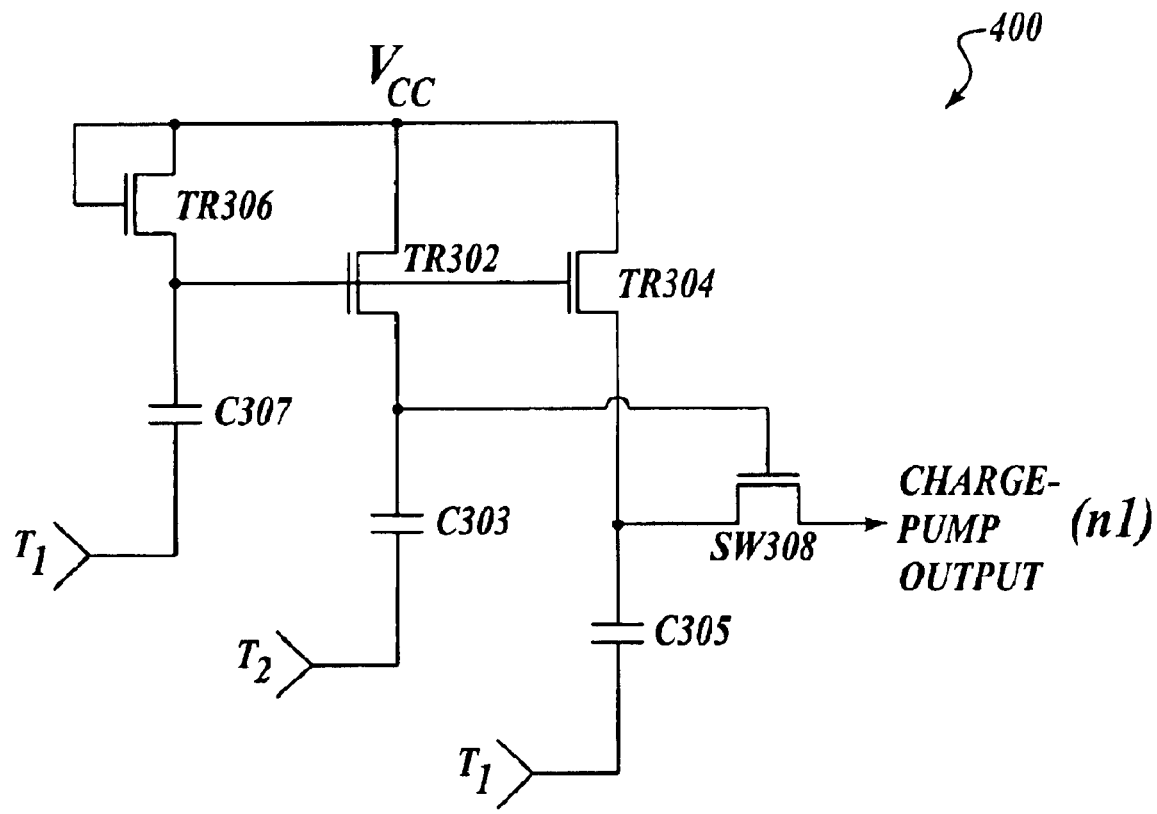
FIG. 4 is a schematic overview of an exemplary charge-pump shown in a simplified manner; in accordance with aspects of the invention.

FIG. 4 is a schematic overview of an exemplary charge-pump shown in a simplified manner, in accordance with aspects of the invention. As illustrated in the figure, charge-pump 400 consists of switches, TR302, TR304, TR306, and SW308 and capacitors, C303, C305, and C307.

Briefly described, a charge-pump is a circuit which is widely used to generate voltages higher than the supply voltage on the chip. Typically, the higher voltage generated by the charge-pump is dependent on power supply variations. Clocks T1 and T2 shown in FIG. 3 are coupled to the bottom plates of capacitors C303, C305, and C307. Signal T1 is coupled to C305 and C307. Signal T2 is coupled to C303.

When clocks T1 or T2 are low, the charge on the bottom plates of the capacitors C303, C305, and C307 are at ground level. The top plates of Capacitors C303, C305, and C307 are precharged to Vcc through transistors TR302, TR304, and TR306. When the clocks go high, the charge on the bottom plates of the capacitors charges to Vcc, thus pumping the top plates of the capacitors to (2*Vcc-Vth). (Vth is the threshold voltage or the minimum voltage required to turn on switch SW308). Since charge is directly proportional to voltage, this operation results in the top plates of capacitors charged up to a high voltage. The frequency of occurrence of the clocks and the size of the capacitors determine the charging capability of the charge-pump.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus to generate a constant voltage higher than a power supply voltage including feedback that is insensitive to power, temperature and process variations, comprising:
   a charge pump circuit, having an input coupled to the supply voltage and an output coupled to a first node, that is arranged to generate the constant voltage higher than the supply voltage at the first node;
   a switched capacitor circuit interface (SCI) having an input coupled to the first node, and an output that is configured to generate a target signal;
   a comparator circuit having an input coupled to the target signal, and an output configured to output a comparison signal, wherein the comparison signal is used to determine when the signal at the first node is constant relative to the target signal; and
   a bypass capacitor interface (BCI) including an input coupled to the comparison signal and an output coupled to the first node, wherein the bypass capacitor interface is configured to maintain the signal at the first node in response to the comparison signal.

2. The apparatus of claim 1, wherein the switched capacitor circuit interface includes a first SCI capacitor and a second SCI capacitor that are sized to generate the target signal.

3. The apparatus of claim 2, wherein the switched capacitor circuit interface further comprises a second input that is coupled to a reference circuit that is configured to generate a stable reference signal.

4. The apparatus of claim 3, wherein the comparator circuit further comprises a second input coupled to a trigger signal that activates the comparator circuit.

5. The apparatus of claim 4, wherein the bypass capacitor interface further comprises:
   a first BCI switch circuit comprising an on state and an off state coupled to the comparison signal and the first node;
   a first BCI capacitor circuit coupled to the first BCI switch circuit; and
   a second BCI capacitor circuit that is larger than the first BCI capacitor circuit and wherein the second BCI capacitor circuit is coupled to the first node and the first BCI switch circuit, the first and second BCI capacitor circuits configured to cause a drop in the voltage of the signal at the first node when the first BCI switch circuit is in the on state.

6. The apparatus of claim 5, further comprising a second BCI switch circuit coupled to discharge a charge on the first BCI capacitor circuit.

7. The apparatus of claim 6, wherein the switched capacitor circuit interface further comprises a first SCI switch coupled to the first node and the first SCI capacitor circuit, a second SCI switch coupled to the first SCI capacitor circuit and a ground reference, a third SCI switch coupled to the first SCI capacitor circuit and the second SCI capacitor circuit, a fourth SCI switch coupled to the second SCI capacitor circuit and the reference signal and a fifth SCI switch coupled to the second SCI capacitor circuit and the ground reference.

8. The apparatus of claim 7, wherein the first SCI switch, the second SCI switch, and the fifth SCI switch are further configured to turn on in response to a first clock signal, wherein the third SCI switch and the fourth SCI switch are further configured to turn on in response to a second clock signal.

9. The apparatus of claim 5, wherein the charge pump circuit further comprises a first charge pump capacitor having a plate coupled to a first clock signal and a second plate coupled to a first charge pump switch, a second charge pump capacitor having a plate coupled to a second clock signal and a second plate coupled to a second charge pump switch; and a third capacitor having a plate coupled to the first clock signal and a second plate coupled to a third charge pump switch and a fourth charge pump switch, wherein the fourth charge pump switch is coupled to the first node.

10. A method for generating a constant voltage higher than a power supply that is insensitive to power, temperature and process variations, comprising:

generating the constant voltage higher than a supply voltage, at a first node, wherein a charge pump circuit is employed to pump up the voltage at the first node;

generating a target signal by employing a switched capacitor circuit;

comparing the target signal to a comparison signal;

determining whether the voltage at the first node is above the constant voltage in response to the comparison, and when, discharging the potential at the first node employing a feedback path by activating a switch circuit that drains the potential at the first node; and determining whether the voltage at the first node is below the constant voltage in response to the comparison, and when, increasing the potential at the first node employing a feedback path by activating a switch circuit that drains the potential at the first node; and determining whether the voltage at the first node is below the constant voltage in response to the comparison, and when, increasing the potential at the first node.

11. The method of claim 10, wherein comparing the target signal to the comparison signal further comprises determining when the target signal is higher than the comparison signal, and when determining that the voltage at the first node is above the constant voltage.

12. The method of claim 10, wherein comparing the target signal to the comparison signal further comprises determining when the target signal is lower than the comparison signal, and when determining that the voltage at the first node is below the constant voltage.

13. An apparatus for generating a constant voltage higher than a power supply that is insensitive to power, temperature and process variations, comprising:

means for generating a higher voltage than a supply voltage, at a first node using a charge pump circuit that is employed to pump up the voltage at the first node;

means for generating a target signal that corresponds to the constant voltage that is higher than the power supply in response to the higher voltage by employing a switched capacitor circuit, means for determining whether the higher voltage is at the constant voltage that is higher than the power supply, and means for discharging the higher voltage when the higher voltage is above the constant voltage by activating a switch circuit that drains the potential at the first node.

* * * * *

UNITED STATES PATENT AND TRADEMARK OFFICE
CERTIFICATE OF CORRECTION

PATENT NO. : 6,828,851 B1
DATED : December 7, 2004
INVENTOR(S) : Lee et al.

It is certified that error appears in the above-identified patent and that said Letters Patent is hereby corrected as shown below:

Column 1,
Line 58, "circuit designed" should read -- circuit is designed --.

Column 4,
Line 51, "hat" should read -- that --.

Column 5,
Line 17, "off position" should read -- "off" position --.
Line 25, "is charged" should read -- discharged --.
Line 48, "FIGS. 1 and 15 related discussion" should read -- FIG. 1 and related discussion --.

Column 8,
Please delete lines 1-5.

Signed and Sealed this

Twenty-fourth Day of May, 2005

JON W. DUDAS
*Director of the United States Patent and Trademark Office*